(12) United States Patent
Rillmann

(10) Patent No.: US 7,690,494 B2
(45) Date of Patent: Apr. 6, 2010

(54) CONVEYOR DEVICE HAVING A FILLING DEVICE FOR VERTICAL FLOW OF MATERIAL, WITHOUT DEMIXING, OF POWDERED MEDIA

(75) Inventor: Thomas Rillmann, Bellheim (DE)

(73) Assignee: Hexal AG, Holzkirchen (DE)

( * ) Notice: Subject to any disclaimer, the term of this patent is extended or adjusted under 35 U.S.C. 154(b) by 345 days.

(21) Appl. No.: 10/589,292

(22) PCT Filed: Mar. 3, 2005

(86) PCT No.: PCT/EP2005/002241

§ 371 (c)(1),
(2), (4) Date: May 3, 2007

(87) PCT Pub. No.: WO2005/085106

PCT Pub. Date: Sep. 15, 2005

(65) Prior Publication Data

US 2008/0014032 A1    Jan. 17, 2008

(30) Foreign Application Priority Data

Mar. 4, 2004    (DE)    .................. 20 2004 003 558 U

(51) Int. Cl.
*B65G 69/16*    (2006.01)
(52) U.S. Cl. ...................................... 193/30
(58) Field of Classification Search ................. 198/598; 193/2 A, 2 D, 4, 30
See application file for complete search history.

(56) References Cited

U.S. PATENT DOCUMENTS

| | | | | | |
|---|---|---|---|---|---|
| 3,576,263 | A | * | 4/1971 | Abendroth | .................. 414/199 |
| 4,727,913 | A | * | 3/1988 | Bliss | .............................. 141/7 |
| 5,016,686 | A | * | 5/1991 | Gerstenkorn | ................. 141/96 |
| 5,154,271 | A | * | 10/1992 | Binzen | ......................... 193/30 |
| 5,190,132 | A | * | 3/1993 | Stanelle et al. | ................ 193/30 |
| 5,322,098 | A | * | 6/1994 | Christianson et al. | ....... 141/279 |
| 5,622,291 | A | * | 4/1997 | Semenenko | ................. 222/527 |
| 5,628,603 | A | * | 5/1997 | Antalffy et al. | ............. 414/216 |
| 5,697,408 | A | * | 12/1997 | Reeves | ........................ 141/284 |
| 6,039,844 | A | * | 3/2000 | Malik | ......................... 202/227 |
| 6,183,232 | B1 | | 2/2001 | Bequette et al. | |
| 6,199,684 | B1 | * | 3/2001 | Huth | ......................... 198/524 |
| 6,206,059 | B1 | * | 3/2001 | Maakad et al. | ............. 141/346 |
| 7,438,171 | B1 | * | 10/2008 | Clark et al. | ................... 193/30 |

FOREIGN PATENT DOCUMENTS

| | | |
|---|---|---|
| DE | 103 24 715 A1 | 11/2004 |
| EP | 0 304 020 A | 2/1989 |
| FR | 2 562 525 A | 10/1985 |

* cited by examiner

*Primary Examiner*—Douglas A Hess
(74) *Attorney, Agent, or Firm*—Licata & Tyrell P.C.

(57) ABSTRACT

The invention relates to a conveyor device having a filling device (7) for vertical flow of material, without demixing, of powdered media having different particle sizes and particle densities, having the following features: a supply container (8) having a lower opening (9) to which the filling device (7) can be coupled; an inlet hopper (1) having an upper inlet opening (10) and a lower outlet opening (11) of a guide tube (12), the inlet opening (10) being couplable to the lower opening (9) of the supply container (8); telescopic elements (13), which are arranged on the guide tube (12), and an outlet hopper (3) having an outlet flap (4).

3 Claims, 2 Drawing Sheets

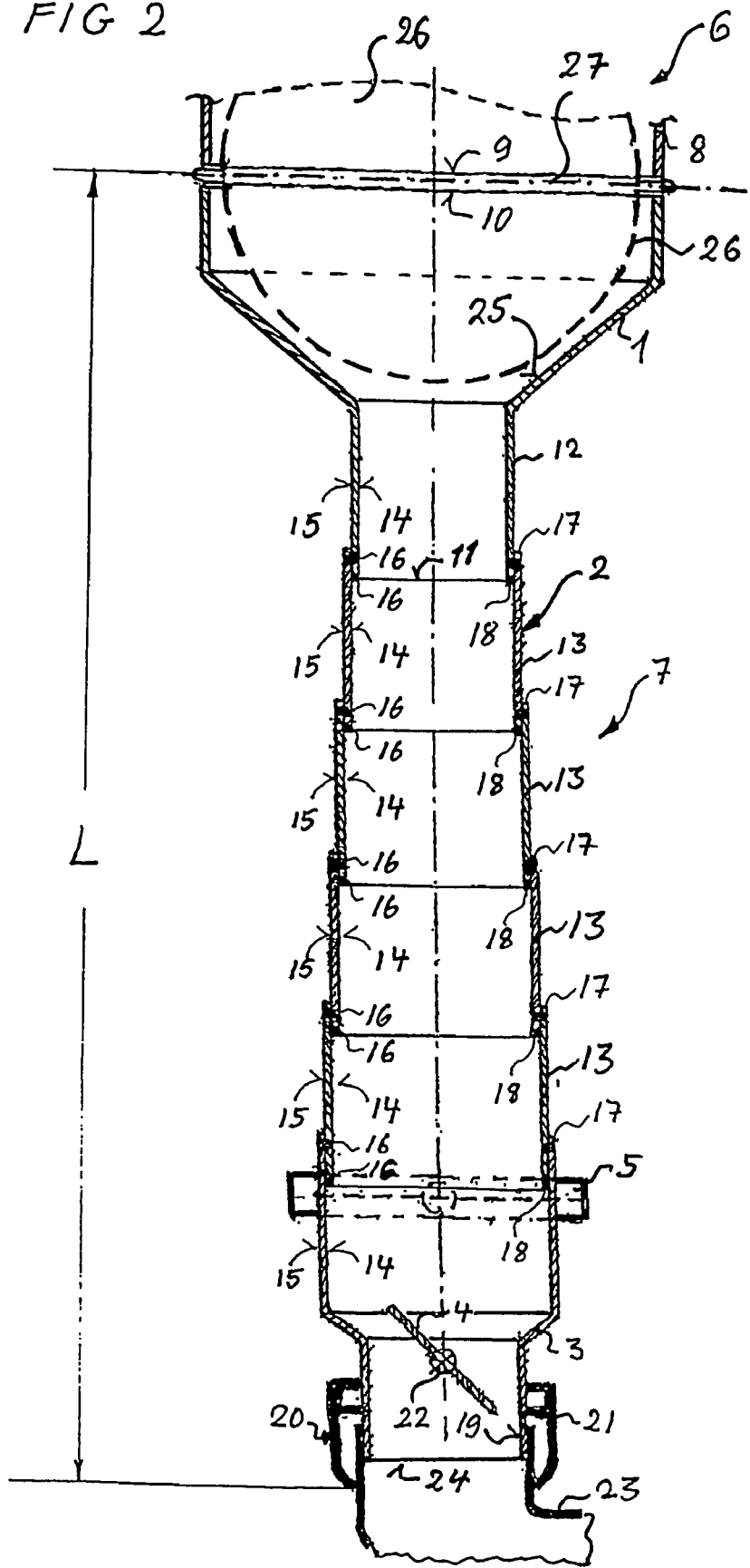

CONVEYOR DEVICE HAVING A FILLING DEVICE FOR VERTICAL FLOW OF MATERIAL, WITHOUT DEMIXING, OF POWDERED MEDIA

This application is a 371 of PCT/EP2005/002241 filed on Mar. 3, 2005, published on Sep. 15, 2005 under publication number WO 2005/085106 A1 which claims priority benefits from German Patent Application Number 20 2004 003 558.8 filed Mar. 4, 2004.

The invention relates to a conveyor device having a filling device for vertical flow of material, without demixing, of powdered media having different particle sizes and different particle densities.

Such conveyor devices having filling devices are used in tabletting processes for transferring the press mass to be tabletted from a supply container, which is located above a tablet press, vertically into a feed shoe of the tablet press. For that purpose, conventional conveyor devices have vertical tube or hose systems which are arranged below the supply container. In such conveyor systems, when the supply container is opened there is a risk that the material to be tabletted will initially drop in free fall as far as the feed shoe until the tube or the hose is completely full, which has the disadvantage, especially in the case of press masses comprising components having different particle sizes and different particle densities, that demixing can occur. Accordingly, in the subsequent tabletting process, inhomogeneities arise in the tablets produced. This impairs the quality and the composition of the tablets and has serious consequences in respect of medication for the final user.

The aim of the invention is further to improve the teaching of DE 103 24 715 and to provide a conveyor device having a filling device that is suitable for achieving vertical flow of material, without demixing, of powdered media having different particle sizes and different particle densities.

That aim is achieved by the subject of the independent claims. Advantageous developments of the invention will be found in the dependent claims.

The invention provides a device having a filling device for vertical flow of material, without demixing, of powdered media having different particle sizes and different particle densities, the conveyor device having a supply container which is arranged vertically above a tablet press.

The supply container has a lower opening to which the filling device can be coupled. The filling device has in turn an inlet hopper having an upper inlet opening which can be coupled to the lower opening of the supply container. Furthermore, the inlet hopper has a lower outlet opening, which is formed by a guide tube and has a smaller diameter than the upper inlet opening. On the guide tube there are arranged telescopic elements and an outlet hopper which has an outlet flap.

The supply container can be constructed so as to be closable. For that purpose, a flap can be provided by means of which the lower container opening can be closed. The flap can be constructed so as to be pivotable about an axis.

When the telescopic elements are in a contracted position, the outlet flap of the outlet hopper is closed and can be opened only when the telescopic elements have been extended and a mouthpiece, which surrounds the lower region of the outlet hopper, has been connected to the feed shoe arranged underneath.

In a preferred embodiment of the invention, the internal diameters and the external diameters of the telescopic elements are so matched to one another that they have a sliding fit. This has the advantage that the contracted telescopic elements can be extended from a contracted position to an extended position without problems.

In a possible embodiment, sealing elements, such as sealing rings, can be dispensed with.

It is also possible for the telescopic elements, which can have a sliding fit, and the outlet hopper each to have on their inner surfaces at least one sealing ring in the region of their upper edges. Such a sealing ring in the region of the upper edges of telescopic elements and outlet hopper can be arranged in an annular recess in the respective inner wall. That has the advantage that when the telescopic elements are extended to form an elongated telescopic tube, the telescopic tube remains sealed to the environment and material cannot escape from the telescopic tube in the extended position.

In a further embodiment of the invention, it is possible for the guide tube of the inlet hopper and the telescopic elements, which can have a sliding fit, each to have at least one sealing ring in the region of their lower edges. Such sealing rings can be arranged in corresponding annular recesses in the respective outer walls. That has the advantage that material from the flow of material cannot become deposited in the gaps of the sliding fit. Furthermore, the ability of the telescopic elements to be displaced relative to one another and the ability of the telescopic elements to be displaced with respect to the outer wall of the inlet hopper and the inner wall of the outlet hopper is not impeded by deposits.

For that purpose, the sealing rings can have sealing lips which are in sealing, sliding contact with the inner walls and outer walls.

It is also possible for sealing elements, for example in the form of sealing rings or sealing lips, to be provided both in the region of the lower edges and in the region of the upper edges, so that each fit gap between the slidable telescopic elements, which can have a sliding fit, as well as between the outer wall of the guide tube of the inlet hopper and the inner wall of the outlet hopper is doubly sealed.

The mouthpiece in the lower region of the outlet hopper is so configured that it can be docked to a feed shoe of a tablet press. For that purpose, the mouthpiece has a rubber-elastic tubular casing which, by virtue of its external diameter, allows a sealed fit to an opening of the feed shoe of a tablet press.

In order to keep the outlet hopper closed while the telescopic elements are in the contracted position, the outlet flap, which is arranged in the outlet hopper and is able to close the outlet opening of the outlet hopper, has a pivot axis about which the outlet flap is pivotable in the interior of the outlet hopper. On the outlet flap there is arranged an operating element arranged outside the outlet hopper. Such an operating element can be constructed so that the outlet flap automatically remains closed when the telescopic elements reach the contracted position. In addition, the operating element can be so constructed that it unlocks the outlet flap and unblocks the opening only when the mouthpiece has been securely arranged in an opening of the feed shoe.

Furthermore, the outlet hopper has a handle which is arranged on the outer surface of the outlet hopper. By means of the handle it is advantageously possible to pull the telescopic elements out of one another and to push them one inside the other as well as to dock the mouthpiece to the feed shoe after an extending operation.

The handle can co-operate with an automatic introduction or operating device and/or can be operated by an operator.

In summary, the particular advantage of the telescopic filling device is that press masses comprising components of different particle sizes and different particle densities are conveyed from the supply container into the feed shoe without demixing. When the supply container is opened, the telescopic tube comprising telescopic elements is initially in the fully contracted position. After the supply container has been opened, the telescopic tube, with the outlet flap closed, is slowly guided downwards by means of the handle, so that free-fall of the powdered medium with the composition of the subsequent press mass and demixing of the powdered medium is prevented. The outlet flap of the filling device in the lower region of the outlet hopper is then opened only after docking to the feed shoe of a tabletting machine.

The invention will now be described in greater detail with reference to the accompanying Figures:

FIG. 2 shows a conveyor device having a filling device according to FIG. 1, after the filling device has been docked to a feed shoe.

Figure 1:
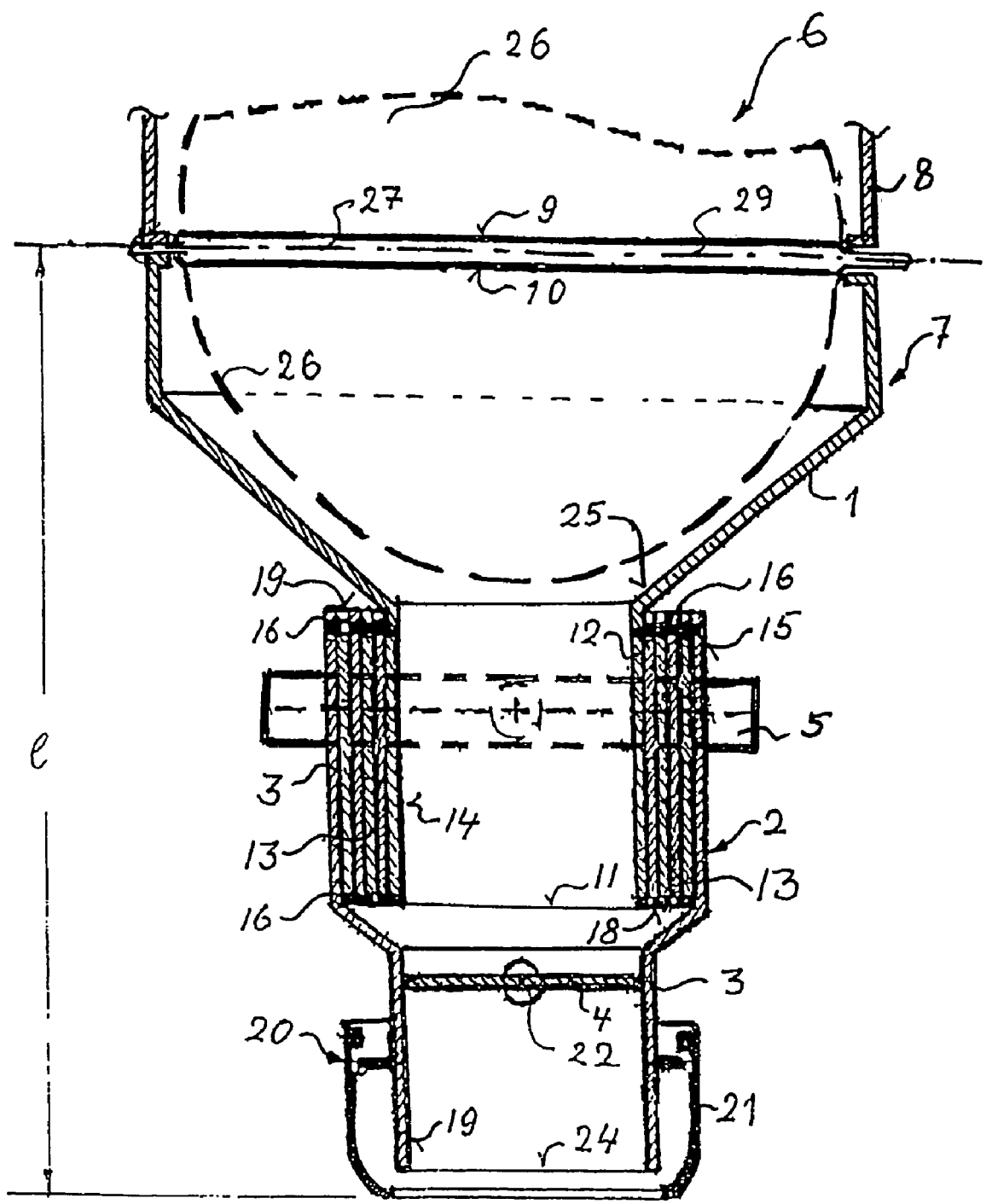
FIG. 1 shows a conveyor device having a filling device in accordance with an embodiment of the invention, after the filling device has been docked to a supply container.

FIG. 1 shows a conveyor device 6 having a filling device 7 in accordance with an embodiment of the invention, after the filling device 7 has been docked to a supply container 8. The supply container 8 has a lower opening 9 to which an inlet hopper 1 is coupled by its upper opening 10. The lower opening 9 of the supply container 8 is closable by means of a flap 26, the flap 26, the outline of which is shown by a dotted line, being pivoted about the axis 27. In the position shown here by the dotted line, the flap 26 is in an open position.

The inlet hopper 1 serves at the same time for receiving a telescopic tube 2 which is shown in the contracted position in FIG. 1. In this embodiment the telescopic tube 2 consists of four telescopic elements 13 which, by virtue of their graduated diameters, are pushed one inside the other by sliding. The innermost telescopic element 13 is arranged to slide on the outer wall of a guide tube 12, which is rigidly connected to the inlet hopper 1, and carries the contracted telescopic tube 2 on its outer wall.

The guide tube 12 has an outlet opening 11 which is smaller than the inlet opening 10 at the upper side of the inlet hopper 1. The inner contour 25 of the inlet hopper 1 is funnel-shaped in this embodiment and can also have the shape of a truncated cone. The telescopic elements 13 pushed one inside the other are surrounded on the outside by an outlet hopper 3, which has in its lower region 19 a filling opening 24 which is very slightly larger than the outlet opening 11 of the guide tube 12 of the inlet hopper 1. When the telescopic tube 2 is in the contracted position, the filling opening 24 of the outlet hopper 3 is closed by an outlet flap 4 which is pivotable about axis 22.

Accordingly, after the filling device 7 has been docked to the supply container 8, the powdered medium to be conveyed is able to fill the inlet hopper 1 in the outlet hopper 3 only as far as the outlet flap 4. The outlet hopper 3 has, outside the filling volume, a handle 5 which is connected to the outer wall of the outlet hopper 3 and which guides the telescopic tube 2 during the extension and contraction of the telescopic elements 13. In the lower region 19 of the outlet hopper 3 there is also arranged a mouthpiece 20 which has a rubber-elastic tubular casing 21 which is connectible to a tubular socket of the feed shoe.

In this embodiment of the invention, the total length l of the contracted filling device 7 is about 30 cm and the inlet opening 10 has a diameter of about 25 cm, while the diameter of the outlet opening 11 is about 9 cm. The filling opening 24 at the end of the outlet hopper 3 has a diameter of about 10 cm, which at the same time also corresponds to the diameter of the outlet flap 4. Because the filling opening 24 is very slightly larger than the outlet opening 11 it is ensured that there is no clogging of the media on transition from the outlet hopper 3 to the feed shoe. The outlet flap 4 has only one special embodiment. Alternative embodiments of the outlet flap 4 can have, for example, two bows which are pivoted towards one another for opening, and in so doing are turned in opposite directions about the axis 22.

FIG. 2 shows a conveyor device 6 having a filling device 7 according to FIG. 1, after the filling device 7 has been docked to a feed shoe 23. Components having the same functions as in FIG. 1 are indicated by the same reference numerals and are not discussed separately.

For docking the filling device 7 to the feed shoe 23, the telescopic tube 2 has been extended with the aid of the handle 5 so that the filling device 7 has a length L of about 75 cm and can be docked to the feed shoe 23 arranged vertically below the supply container 8 by means of the mouthpiece 20 of the filling device 7. In order to seal the four telescopic elements 13 relative to one another and relative to the inlet hopper 1 and the outlet hopper 3, corresponding sealing rings 16 are provided on the upper and lower edges 17 and 18 of the telescopic elements 13. For that purpose, the guide tube 12 of the inlet hopper 1 and the telescopic elements 13 each have at least one sealing ring 16 in the region of their lower edges 18. The sealing ring 16 is for that purpose arranged in an annular recess of the respective outer surfaces 15 of guide tube 12 and telescopic elements 13.

A further sealing ring 16 is arranged at the upper edges 17 of the telescopic elements 13 and of the outlet hopper 3, the inner surfaces 14 having for that purpose an annular recess on the respective inner surface 14 to accommodate the sealing ring 16. Accordingly, the gap between the telescopic elements 13 themselves and between the telescopic elements 13 and the guide tube 12 of the inlet hopper 1 and the inner surface 14 of the outlet hopper 3 is in each case safeguarded by two sealing rings 16. As FIG. 2 shows, when the telescopic tube 2 is docked to the feed shoe 23, the outlet flap 4 is in an open position. The outlet flap 4 can be rotated into that position about the axis 22 from outside the filling device 7 with the aid of an operating element.

LIST OF REFERENCE NUMERALS 1 inlet hopper
2 telescopic tube
3 outlet hopper
4 outlet flap
5 handle
6 conveyor device
7 filling device
8 supply container
9 lower opening of the supply container
10 inlet opening of the inlet hopper
11 outlet opening
12 guide tube
13 telescopic element
14 inner surface of the telescopic elements
15 outer surfaces
16 sealing ring
17 upper edges
18 lower edges
19 lower region of the outlet hopper
20 mouthpiece
21 rubber-elastic tubular casing 22 axis of the outlet flap
23 feed shoe
24 filling opening
25 inner contour
26 flap
27 axis
l length of filling device when contracted
L length of filling device when extended

The invention claimed is:

1. Conveyor device having a filling device (7) for vertical flow of material, without demixing, of powdered media having different particle sizes and particle densities, having the following features:
 a supply container (8) having a lower opening (9) to which the filling device (7) can be coupled;
 an inlet hopper (1) having an upper inlet opening (10) and a lower outlet opening (11) of a guide tube (12), the inlet opening (10) being couplable to the lower opening (9) of the supply container (8);
 telescopic elements (13), which are arranged on the guide tube (12), and an outlet hopper (3) having an outlet flap (4) with a pivot axis,
 wherein the outlet flap (4) is pivotable about an axis (22) inside the outlet hopper (3) and is displaceable by means of an operating element arranged outside the outlet hopper (3).

2. Conveyor device having a filling device (7) for vertical flow of material, without demixing, of powdered media having different particle sizes and particle densities, having the following features:
 a supply container (8) having a lower opening (9) to which the filling device (7) can be coupled;
 an inlet hopper (1) having an upper inlet opening (10) and a lower outlet opening (11) of a guide tube (12), the inlet opening (10) being couplable to the lower opening (9) of the supply container (8);
 telescopic elements (13), which are arranged on the guide tube (12), and an outlet hopper (3) having an outlet flap (4) with a pivot axis,
 wherein the outlet flap (4) is closed when the telescopic elements (13) are in a contracted position and while the telescopic elements (13) are being extended, and when the telescopic elements (13) are in the extended position the outlet flap (4) is open when a mouthpiece (20) of the outlet hopper (3) has been docked to a feed shoe (23).

3. Filling device especially for a conveyor device having a filling device (7) for vertical flow of material, without demixing, of powdered media having different particle sizes and particle densities, having the following features:
 a supply container (8) having a lower opening (9) to which the filling device (7) can be coupled;
 an inlet hopper (1) having an upper inlet opening (10) and a lower outlet opening (11) of a guide tube (12), the inlet opening (10) being couplable to the lower opening (9) of the supply container (8);
 telescopic elements (13), which are arranged on the guide tube (12), and an outlet hopper (3) having an outlet flap (4) with a pivot axis,
 wherein the filling device (7) has the following features:
  an inlet hopper (1) having an upper inlet opening (10) and a lower outlet opening (11) of a guide tube (12), the inlet opening (10) being couplable to a lower opening (9) of a supply container (8);
  telescopic elements (13), which are arranged on the guide tube (12) and carry an outlet hopper (3) having an outlet flap (4) with a pivot axis.

* * * * *